Patented Oct. 21, 1941

2,259,698

UNITED STATES PATENT OFFICE 2,259,698

PHYSIOLOGICALLY EFFECTIVE SUBSTANCE AND PROCESS OF PREPARING SAME

Fritz Johannessohn, Mannheim-Feudenheim, and Hans Hatzig, Mannheim-Waldhof, Germany, assignors to Rare Chemicals, Inc., Nepera Park, N. Y., a corporation of New York No Drawing. Application May 6, 1939, Serial No. 272,150. In Germany May 7, 1938

23 Claims. (Cl. 260—397.5)

Our invention relates to physiologically effective compounds of the cyclopentano hydrophenanthrene series and to processes for the manufacture of same.

It is well known to those skilled in the art that by the treatment of sterols or their derivatives still containing the side chain with oxidising agents capable of splitting off partially or completely the side chain, such as chromic acid or potassium permanganate, one may procure physiologically valuable substances. Thus, by the oxidation of the cholesterol, cholestenone, etc., for example, one obtains substances which possess the activity of a male sexual hormone or of a corpus luteum hormone, as for instance dehydroandrosterone, androstendione, progesterone and the like. The substances may be separated from the oxidation mixture by various methods, whereby at first the volatile and acid degradation products must be removed. The removal of the acid constituents can be effected, for example, by means of alkaline agents, such as aqueous alkali hydroxide, whereby in most cases difficultly soluble alkali salts are obtained.

We have now found that the acid constituents as resulting in ample quantity from the oxidation of sterols by chromic acid, for example, represent a good starting material for the manufacture of primary alcohols. We have furthermore found that these primary alcohols possess physiological activity, especially the activity of male sexual hormones.

Therefore, the subject of our invention is the conversion of the acid constituents obtained by the treatment of sterols and their derivatives still containing the side chain with agents capable of splitting up carbon to carbon bonds, such as chromic acid, potassium permanganate, etc., into primary alcohols.

As it is well known to those skilled in the art, these acid constituents represent a mixture of different acids of the general formula:

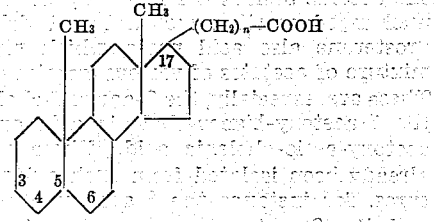

wherein $n$ is zero or a whole, positive figure and the ring skeleton may be saturated or may contain double bonds. If double bonds are present, they are especially in the position 4,5 or 5,6; there may be more double bonds, however not more than two double bonds in the same ring. The side chain clinging to the C atom 17 may be straight or arborescent.

The ring skeleton may, according to the starting material and its treatment, contain various substituents, preferably oxygen containing substituents, such as hydroxy groups, esterified hydroxy groups, ketonic oxygen and the like, which especially adhere to the C atom 3.

According to the kind of the sterol subjected to the oxidation there may be in the oxidation mixture acids of the cholesterol series as well as of the dihydro-cholesterol or the coprosterol series; if substituents are present in position 3, the acids in question may appertain to the normal or to the epi-series.

Thus, the acids contained in the said oxidation mixtures and therefore to be taken into consideration for our process may in the case of dihydro-cholesterol as starting material be the 3-hydroxy-allocholaic acid, the 3-hydroxy-bisnorallocholaic acid and the 3-hydroxy-aetio-allocholaic acid or, employing the epi-dihydrocholesterol, the corresponding epi-compounds; starting from coprosterol or epi-coprosterol, in the same manner are obtained the 3-hydroxycholaic acid, the 3-hydroxy-nor-cholaic acid etc., or the epi-acids respectively. From unsaturated sterols, such as cholesterol, stigmasterol, sitosterol, cinchol, result unsaturated acids, for instance from cholesterol: 3-hydroxy-cholenic acid, 3-hydroxy-nor-cholenic acid, 3-hydroxy-bisnorcholenic acid and 3-hydroxy-aetio-cholenic acid, i. e. rather the 3-acylated acids. When no protection of the hydroxy groups has been effected before the oxidation or when starting from a ketonic derivative of sterols, e. g. cholestenone, one obtains ketonic acids, such as, for example, 3-keto-cholenic acid.

As we have now found, there are to be attained primary alcohols of physiological activity by reduction of derivatives of these acids, which possess the general formula:

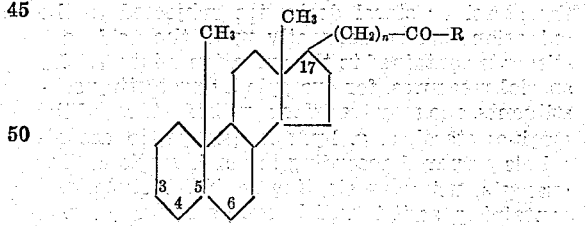

wherein $n$ is zero or a whole, positive figure and R=alkoxy or halogen. The esterification or halogenation of the carboxyl group and the reduction of the arising esters or halides may be effected according to various methods.

When taking the route to the primary alcohols via the esters, one performs the esterification of the acids by means of sulphuric acid and methanol, for example, or by means of diazo-methane, and reduces for instance the obtained methyl ester by means of sodium and alcohol according to Bouveault and Blanc (see "Comptes Rendus de l'Académie des Sciences," tome 136, page 1676). The mixture of acids may be esterified as a whole and the mixture of the resulting esters subsequently be reduced, whereby a mixture of physiologically effective alcohols is obtained, which may be applied in therapeutics as such or may be separated into its several parts. But one may also first separate the mixture of acids into the single constituents by various methods and transform the acids each for itself into the respective primary alcohol.

In many cases it may be preferable to prepare the halides, e. g. the chlorides, of the acids instead of the esters, for instance by treating the acids with phosphorus chlorides or thionyl chloride. The obtained chlorides may now be reduced to the primary alcohols catalytically, for instance according to the method of Rosenmund (see "Berichte der Deutschen Chemischen Gesellschaft," 1921, tome 54, page 638).

In this case one may also work up the mixture of acids direct, i. e. without separating it into its components, or reduce the single individuals.

Therefore, the primary alcohols obtainable according to the above mentioned processes and being the subject of our application possess the following general formula:

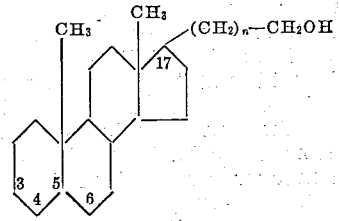

wherein again $n$ is zero or a whole, positive figure. The side chain may again be straight or arborescent. Especially those alcohols deserve interest where the $CH_2OH$-group is fixed immediately to the C atom 17 or is separated from it by one, two or three $CH_2$-groups; although in many cases alcohols with a longer side chain may be of importance. The ring skeleton may be saturated or unsaturated, it may carry substituents or may be unsubstituted. Particularly interesting are again the alcohols which possess a double bond in position 4,5 or 5,6 and carry in position 3 an oxygen containing group, e. g. a hydroxy group. Of course, the nature of the obtained alcohol depends to a high degree upon the sterol or sterol derivative subjected to the oxidation and consequently upon the acid constituents contained in the oxidation mixture. By special measures, for example by protecting substituents, one may transfer certain features of the original sterol, e. g. hydroxy groups, to the alcohols prepared according to our invention. For example, using as starting material cholesterol containing, as it is well known, a hydroxy group in position 3 one may by acetylating the hydroxy group take care that the acids, which form the acid part of the oxidation mixture, carry the same hydroxy group in position 3 after saponification, such as 3-hydroxy-cholenic acid, 3-hydroxy-aetio-cholenic acid and the like. Consequently, reducing these acids one obtains the corresponding alcohols, viz. 3-hydroxy-cholenyl-methanol and 3-hydroxy-aetio-cholenyl-methanol respectively. On reducing according to the above mentioned methods, a hydrogenation of nuclear double bonds generally does not take place. Sometimes it is not necessary to saponify the acids, because by the said methods of reduction a saponification to the hydroxy groups may happen. Thus, one obtains the same 3-hydroxy-cholenyl-methanol starting either from the 3-acetoxy-cholenic acid methyl ester or the 3-hydroxy-cholenic acid methyl ester. If an originally existing ketonic group, e. g. in position 3, is desired to be preserved in the corresponding alcohol, one must take care, of course, to protect the ketonic group before the reduction of the acid; afterwards the ketonic group may be regenerated in the usual manner.

According to our invention one obtains, for example, the following alcohols: 3-hydroxy-cholenyl methanol, 3-hydroxy-bisnor-cholenyl methanol, 3-hydroxy-aetio-cholenyl methanol, 3-epi-hydroxy-allocholanyl methanol, 3-epi-hydroxy-aetio-allocholanyl methanol and many others.

Of course, these examples are to be considered as a selection for demonstration only and signify by no means a limitation to the said alcohols.

The alcohols obtained according to our invention possess physiological activity, preferably the activity of male sexual hormones. Now, the acid constituents of the reaction mixtures attained at the oxidation of sterols etc. being considerable in quantity and, furthermore, the reactions applied for the transformation of the acid constituents into the primary alcohols being chief reactions which pass with good yield, our invention therefore renders it possible to prepare substances of the activity of a male sexual hormone, for example, in a simple manner and with good yield.

The new alcohols are well crystallisable, colorless compounds, which melt, as a rule, above 100° C., and which are soluble in the ordinary organic solvents, such as ether, acetone, alcohols—preferably low aliphatic alcohols—and insoluble or difficultly soluble in water, acids and alkalies. They possess optic activity and form well crystallisable derivatives, e. g. diacetates, which are likewise optically active.

*Examples*

(1) On oxidation of cholesterol acetate dibromide with chromic acid and debromination of the oxidation mixture (see for example "Helvetica Chimica Acta," 1935, tome XVIII, page 931) one obtains besides the neutral parts containing unchanged starting material and dehydro-androsterone also acid parts, which represent a mixture of acetates of various unsaturated acids. These are, especially, the 3-acetoxy-cholenic acid, the 3-acetoxy-bisnor-cholenic acid and the 3-acetoxy-aetio-cholenic acid. These acids have already been isolated from such oxidation mixtures, for instance the 3-acetoxy-cholenic acid and the 3-acetoxy-nor-cholenic acid from the acid constituents obtained on oxidising cholesterol acetate dibromide or sitosterol acetate dibromide; likewise the 3-acetoxy-bisnor-cholenic acid from stigmasterol acetate dibromide and phytosterol acetate dibromide (see for example British patent specification 453,773). On saponifying the acetates one obtains the free acids, which have also been described in literature.

10 g. of the acid constituents contained in the oxidation mixture of cholesterol acetate dibromide and isolated therefrom for instance according to the methods applied in the above mentioned British patent specification are dissolved in 250 cc. of methanol, and 2 cc. of sulphuric acid are added. This solution is heated for one hour with reflux. After cooling the mixture of esters is precipitated by adding water and recrystallised from acetone.

The carefully dried mixture of esters, which is obtained in a yield of about 10 grams is now dissolved in 3-4 times the quantity of absolute alcohol. This solution is dropped onto 5 grams of coarsely cut sodium. After heating several hours under reflux the whole of the sodium is dissolved by adding sufficient absolute alcohol, whereupon heating on the steam-bath with reflux is continued for another hour. Now the solution is still more diluted with water and repeatedly shaken out with ether. The united ethereal extracts are washed neutral, dried and evaporated. The residue represents a mixture of primary alcohols of which the following have been isolated:

3-hydroxy - aetio - cholenyl - methanol, melting-point 196–199°, $C_{20}H_{32}O_2$: calc. 78.93% C, 10.53% H, found 79.02% C, 10.59% H.

3-hydroxy-bisnor - cholenyl - methanol, melting-point 202–206°, $C_{22}H_{36}O_2$: calc. 79.5% C, 10.8% H, found 79.3% C, 10.8% H.

3-hydroxy - cholenyl - methanol, melting-point 196–197°, $C_{24}H_{40}O_2$: calc. 80.0% C, 11.1% H, found 79.5% C, 11.1% H.

$[\alpha]_D = -33°$ (in pure ethyl-alcohol).

(2) Epi-dihydro-cholesterol is oxidised with chromic acid as it is described for example in "Helvetica Chimica Acta," tome XVII, page 1403:

A solution of 50 g. of chromium trioxide in 30 cc. of water and 150 cc. of glacial acetic acid is added drop by drop to 20 g. of epi-dihydro-cholesterol acetate in about one litre of glacial acetic acid while stirring and heating. After heating several further hours surplus chromium trioxide is destroyed by addition of methanol. Thereupon the glacial acetic acid is distilled off in vacuo; the residue is taken up with water and repeatedly shaken with ether. The united ethereal extracts are thoroughly washed with water and thereupon shaken with about 10% sodium hydroxide lye in order to separate the acid parts, whereby difficultly soluble sodium salts precipitate. By decomposing these salts with dilute sulphuric acid one obtains a mixture of acetates of acids of the allocholane series which differ in the number of C atoms contained in the side chain. By means of usual methods one may separate the mixture of acids into the single components, thus obtaining the following acids: 3-epi-acetoxy-allocholaic acid, 3-epi-acetoxy-nor-allocholaic acid, 3-epi-acetoxy-bisnor-allocholaic acid, 3-epi-acetoxy-aetio-allocholaic acid. These acids, especially the not esterified acids, are described for example in "Berichte der Deutschen Chemischen Gesellschaft," tome 68, page 1814f.

The single acids are suspended in 20 times the quantity of ether, and an excess of diazo-methane in ethereal solution is added. After standing several hours the acid is dissolved, whereby this process may be accelerated by adding some methanol. The surplus diazo-methane is destroyed by some cubic centimetres of acetic acid, and the volatile parts of the reaction mixture are distilled off. The residue represents the methyl ester of the employed acid, which may be subjected without further purification to the reduction as it is described in Example 1. One obtains thus the following primary alcohols:

(a) 3-epi-hydroxy-allocholanyl methanol, melting-point 187–189° C., $[\alpha]_D = +36°$ (in abs. alcohol), calc. 79.49% C, 11.59% H, found 79.78% C, 11.77% H.

The compound forms a diacetate which melts at 114–116°; $[\alpha]_D = +34°$ (in abs. alcohol), calc. 75.28% C, 10.31% H, found 75.12% C, 10.48% H.

(b) 3-epi-hydroxy - nor - allocholanyl methanol, melting point 213–213.5° C., $[\alpha]_D = +31°$ (in abs. alcohol), calc. 79.24% C, 11.48% H, found 79.15% C, 11.34% H.

Diacetate: melting-point 135–137° C., $[\alpha]_D = 34.5°$ (in abs. alcohol), calc. 74.94% C, 10.18% H, found 75.03% C, 10.01% H.

(c) 3-epi-hydroxy-bisnor-allocholanyl methanol, melting-point 230–232° C., $[\alpha]_D = +27°$ (in abs. alcohol), calc. 78.97% C, 11.37% H, found 79.32% C, 11.51% H.

Diacetate: melting-point 146–147° C, $[\alpha]_D = +25°$ (in abs. alcohol), calc. 74.59% C, 10.04% H, found 74.60% C, 10.21% H.

(d) 3-epi-hydroxy-aetio-allocholanyl methanol, melting-point 221–223° C., $[\alpha]_D = +22°$ (in abs. alcohol), calc. 78.35% C, 11.10% H, found 78.09% C, 11.2% H.

Diacetate: melting-point 105–106° C, $[_D] = +16°$ (in abs. alcohol), calc. 73.83% C, 9.74% H, found 73.91% C, 9.87% H.

Instead of separating the mixture of acids into the single acids one may also esterify as a whole, whereby a mixture of said alcohols is obtained. This mixture may be applied direct in therapeutics, thus saving the various procedures of separation.

(3) The mixture of acids obtained on oxidising epi-dihydrocholesterol (see Example 2) is—instead of esterifying it—transformed to the corresponding mixture of acid-chlorides by means of thionyl chloride.

5 grams of this mixture are dissolved in 100 cc. of xylol. To this mixture 2–3 drops of chinolin and 3 grams barium sulphate-palladium catalyser are added. One hydrogenises 5 hours at a bath temperature of 120–130° C. Thereupon the catalyser is filtered off and the xylol layer shaken consecutively with dilute acid, dilute alkali lye and water.

After distilling off the xylol in vacuo one obtains a residue in a quantity of about 5 grams, which is transformed to acid esters by heating with phthalic anhydride. The esters are separated from the reaction mixture on the strength of their solubility in alkalis and subsequently saponified. Thus, the primary alcohols described in Example 2 under (a)–(d) are obtained.

Various changes may be made in the details disclosed in the foregoing specification without departing from the invention or sacrificing the advantages thereof.

In the claims affixed to this specification no selection of any particular modification of the invention is intended to the exclusion of other modifications thereof, and the right to subsequently make claim to any modification not covered by these claims is expressly reserved.

We claim:

1. Process of preparing primary alcohols with physiological activity consisting in separating the carboxylic acids, which arise on oxidation of compounds with the cyclopentano hydrophenanthrene skeleton and a side chain in position 17 of this skeleton, from the mixture of the oxidation products by saponifying their acetyl compounds and transforming their esters to primary alcohols by reduction.

2. Process of preparing primary alcohols with physiological activity consisting in separating the carboxylic acids, which arise on oxidation of unsaturated, but not more than two double bonds in the same ring containing compounds with the cyclopentano hydrophenanthrene skeleton and a side chain in position 17 of this skeleton, from the mixture of the oxidation products by saponifying their acetyl compounds and transforming their esters to primary alcohols by reduction.

3. Process of preparing primary alcohols with physiological activity consisting in separating the carboxylic acids, which arise on oxidation of oxygen containing compounds with the cyclopentano hydrophenanthrene skeleton and a side chain in position 17 of this skeleton, from the mixture of the oxidation products by saponifying their acetyl compounds and transforming their esters to primary alcohols by reduction.

4. Process of preparing primary alcohols with physiological activity consisting in separating the carboxylic acids, which arise on oxidation of 3-hydroxy-Δ5,6-compounds with the cyclopentano hydrophenanthrene skeleton and a side chain in position 17 of this skeleton, from the mixture of the oxidation products by saponifying their acetyl compounds and transforming their esters to primary alcohols by reduction.

5. Process of preparing primary alcohols with physiological activity consisting in separating the carboxylic acids, which arise on oxidation of 3-acyloxy-Δ5,6-compounds with the cyclopentano hydrophenanthrene skeleton and a side chain in position 17 of this skeleton, from the mixture of the oxidation products by saponifying their acetyl compounds and transforming their esters to primary alcohols by reduction.

6. Process of preparing primary alcohols with physiological activity consisting in separating the carboxylic acids, which arise on oxidation of 3-keto-Δ5,6-compounds with the cyclopentano hydrophenanthrene skeleton and a side chain in position 17 of this skeleton, from the mixture of the oxidation products by saponifying their acetyl compounds and transforming their esters to primary alcohols by reduction.

7. Process of preparing primary alcohols with physiological activity consisting in separating the carboxylic acids, which arise on oxidation of compounds with the cyclopentano hydrophenanthrene skeleton and a side chain in position 17 of this skeleton, from the mixture of the oxidation products by saponifying their acetyl compound, transforming them to esters, precipitating the esters with water and reducing the latter to primary alcohols.

8. Process of preparing primary alcohols with physiological activity consisting in separating the carboxylic acids, which arise on oxidation of compounds with the cyclopentano hydrophenanthrene skeleton and a side chain in position 17 of this skeleton, from the mixture of the oxidation products by saponifying their acetyl compounds, transforming them to halides with thionyl chloride and reducing the latter to primary alcohols.

9. Process of preparing primary alcohols with physiological activity consisting in separating the carboxylic acids, which arise on oxidation of 3-hydroxy-Δ5,6-compounds with the cyclopentano hydrophenanthrene skeleton and a side chain in position 17 of this skeleton, from the mixture of the oxidation products by saponifying their acetyl compound, transforming them to esters, precipitating the esters with water and reducing the latter to primary alcohols.

10. Process of preparing primary alcohols with physiological activity consisting in separating the carboxylic acids, which arise on oxidation of 3-acyloxy-Δ5,6-compounds with the cyclopentano hydrophenanthrene skeleton and a side chain in position 17 of this skeleton, from the mixture of the oxidation products by saponifying their acetyl compound, transforming them to esters and reducing the latter to primary alcohols.

11. Process of preparing primary alcohols with physiological activity consisting in separating the carboxylic acids, which arise on oxidation of 3-acyloxy-Δ5,6-compounds with the cyclopentano hydrophenanthrene skeleton and a side chain in position 17 of this skeleton, from the mixture of the oxidation products by saponifying their acetyl compound, transforming them to esters, reducing the esters to primary alcohols and saponifying the latter.

12. Process of preparing primary alcohols with physiological activity consisting in separating the carboxylic acids, which arise on oxidation of 3-acyloxy-Δ5,6-compounds with the cyclopentano hydrophenanthrene skeleton and a side chain in position 17 of this skeleton, from the mixture of the oxidation products, saponifying them, transforming the free acids to esters, precipitating the esters with water and reducing the latter to primary alcohols.

13. Process of preparing primary alcohols with physiological activity consisting in separating the carboxylic acids, which arise on oxidation of 3-keto-Δ5,6-compounds with the cyclopentano hydrophenanthrene skeleton and a side chain in position 17 of this skeleton, from the mixture of the oxidation products by saponifying their acetyl compound, transforming them to esters, precipitating the esters with water and reducing the latter to primary alcohols.

14. Unsaturated primary alcohols of the general formula:

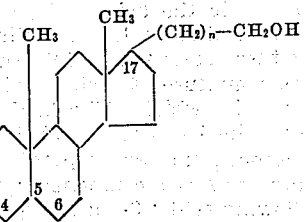

wherein $n$ is zero or a whole positive figure and the cyclopentano hydrophenanthrene skeleton contains not more than two double bonds in the same ring, one of these double bonds being in 4,5 or 5,6 position, which are colorless, crystalline, optically active, physiologically effective, soluble in alcohols, ether, acetone, and difficultly soluble in water, alkalis, acids.

15. Unsaturated primary alcohols of the general formula:

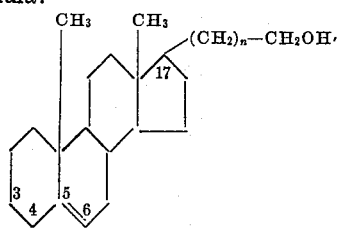

wherein $n$ is zero or a whole positive figure and the cyclopentano hydrophenanthrene skeleton contains a double bond in position 5,6, which are colorless, crystalline, optically active, physiologically effective, soluble in alcohols, ether, acetone, and difficultly soluble in water, alkalis, acids.

16. Unsaturated primary alcohols of the general formula:

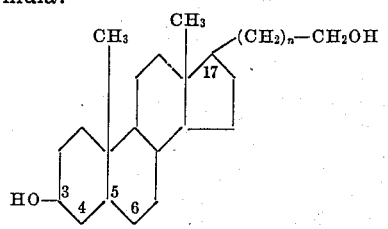

wherein $n$ is zero or a whole positive figure and the cyclopentano hydrophenanthrene skeleton contains not more than two double bonds in the same ring, one of these double bonds being in 4,5 or 5,6 position, which are colorless, crystalline, optically active, physiologically effective, soluble in alcohols, ether, acetone, and difficultly soluble in water, alkalis, acids.

17. Unsaturated primary alcohols of the general formula:

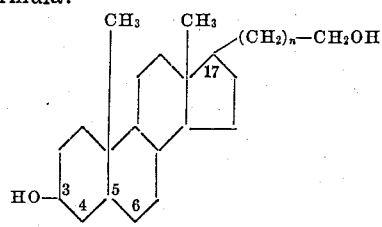

wherein $n$ is zero or a whole positive figure and the cyclopentano hydrophenanthrene skeleton contains not more than two double bonds in the same ring, one of these double bonds being in 4,5 or 5,6 position and an oxygen group in position 3, which are colorless, crystalline, optically active, physiologically effective, soluble in alcohols, ether, acetone, and difficultly soluble in water, alkalis, acids.

18. Unsaturated primary alcohols of the general formula:

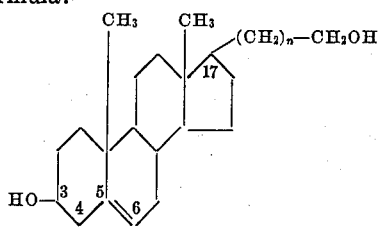

wherein $n$ is zero or a whole positive figure and the cyclopentano hydrophenanthrene skeleton contains a hydroxy group in position 3 and a double bond in position 5,6, which are colorless, crystalline, optically active, physiologically effective, soluble in alcohols, ether, acetone, and difficultly soluble in water, alkalis, acids.

19. Unsaturated primary alcohols of the general formula:

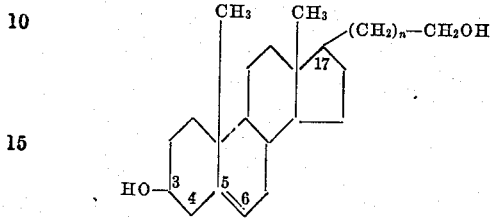

wherein $n$ is zero or a whole positive figure and the cyclopentano hydrophenanthrene skeleton contains an oxygen group in position 3 and a double bond in position 5,6, which are colorless, crystalline, optically active, physiologically effective, soluble in alcohols, ether, acetone, and difficultly soluble in water, alkalis, acids.

20. The primary alcohol of the constitution of a 3-hydroxy-Δ5,6-cholenyl methanol, which is colorless, crystalline, optically active, physiologically effective, soluble in alcohols, ether, acetone, difficultly soluble in water, alkalis, acids, and melts at 196–197°.

21. The primary alcohol of the constitution of a 3-hydroxy-Δ5,6-bisnor-cholenyl methanol, which is colorless, crystalline, optically active, physiologically effective, soluble in alcohols, ether, acetone, difficultly soluble in water, alkalis, acids, and melts at 202–206°.

22. The primary alcohol of the constitution of a 3-hydroxy-Δ5,6-aetio-cholenyl methanol, which is colorless, crystalline, optically active, physiologically effective, soluble in alcohols, ether, acetone, difficultly soluble in water, alkalis, acids and melts at 196–199°.

23. Unsaturated alcohols of the general formula:

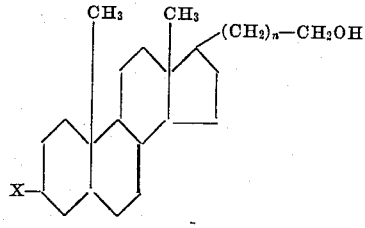

wherein $n$ is an integer including zero and wherein X is selected from the group consisting of hydrogen and hydroxyl and the cyclopentanohydrophenanthrene ring contains not more than two double bonds in the same ring, one of these double bonds being in 4,5 or 5,6 position, which are colorless, crystalline, optically active, physiologically effective, soluble in alcohols, ethers, acetone, and difficultly soluble in water, alkali, and acids.

FRITZ JOHANNESSOHN.
HANS HATZIG.